United States Patent [19]

Hegeman

[11] 4,123,238
[45] Oct. 31, 1978

[54] FLOW-CONTROL NOZZLE FOR FLUE-GAS SCRUBBER

[75] Inventor: Karl-Rudolf Hegeman, Essen, Germany

[73] Assignee: Gottfried Bischoff Bau Kompl. Gastreinigungs- und Wasserruckkuhlanlagen Kommanditgesellschaft, Essen, Germany

[21] Appl. No.: 714,825

[22] Filed: Aug. 16, 1976

[30] Foreign Application Priority Data

Aug. 16, 1975 [DE] Fed. Rep. of Germany ... 7525946[U]

[51] Int. Cl.² .................................................. B01D 47/10
[52] U.S. Cl. .................................. 55/226; 251/124; 251/368; 261/62; 261/116; 261/DIG. 54
[58] Field of Search ............... 55/220, 226; 261/62, 261/116, DIG. 54; 251/368, 124, 357

[56] References Cited

U.S. PATENT DOCUMENTS

| | | |
|---|---|---|
| 2,046,500 | 7/1936 | Carter ...................... 261/DIG. 54 X |
| 2,084,340 | 6/1937 | Hartsough ....................... 261/62 X |
| 2,891,763 | 6/1959 | Fortune ............................ 251/368 X |
| 2,893,687 | 7/1959 | Huthsing, Sr. ................... 251/368 X |
| 3,009,681 | 11/1961 | Carter et al. .................... 251/357 X |
| 3,116,348 | 12/1963 | Walker ..................... 261/DIG. 54 X |
| 3,124,854 | 3/1964 | Dore ............................... 251/368 X |
| 3,350,076 | 10/1967 | Crommelin, Jr. ....... 261/DIG. 54 X |
| 3,396,939 | 8/1968 | Hettich ............................. 251/357 X |
| 3,420,508 | 1/1969 | Hurst et al. ............. 261/DIG. 54 X |
| 3,448,761 | 6/1969 | Feinman .......................... 251/368 X |
| 3,502,308 | 3/1970 | Simizu ..................... 261/DIG. 54 X |
| 3,507,626 | 4/1970 | Van Horn ............... 261/DIG. 54 X |
| 3,517,485 | 6/1970 | Dell'Agnese et al. ................. 55/226 |
| 3,601,374 | 8/1971 | Wheeler ................... 261/DIG. 54 X |
| 3,623,297 | 11/1971 | Barefoot ........................ 261/116 X |
| 3,706,538 | 12/1972 | Chew ................................ 55/220 X |
| 3,767,174 | 10/1973 | Heeney ................... 261/DIG. 54 X |
| 3,844,744 | 10/1974 | Hausberg et al. ....... 261/DIG. 54 X |

FOREIGN PATENT DOCUMENTS 2,305,710 12/1973 Fed. Rep. of Germany ... 261/DIG. 54
2,303,479 8/1974 Fed. Rep. of Germany ............. 55/220

*Primary Examiner*—Frank W. Lutter
*Assistant Examiner*—Kathleen J. Prunner
*Attorney, Agent, or Firm*—Karl F. Ross

[57] ABSTRACT

A nozzle in a descending discharge duct for hot flue gases has a tubular body of hourglass shape partly obstructed by a vertically movable frustoconical insert which defines a narrow, downwardly diverging annular channel with the lower part of the body lying below its waist. The upwardly converging top of the insert, projecting partly above the waist, is coated or clad with a refractory layer and is removable for replacement of that layer.

10 Claims, 3 Drawing Figures

FLOW-CONTROL NOZZLE FOR FLUE-GAS SCRUBBER

FIELD OF THE INVENTION

My present invention relates to a scrubber for hot flue gases, such as those discharged from blast furnaces, and more particularly to a nozzle designed to control the flow of these gases through a washing station.

BACKGROUND OF THE INVENTION

The scrubbing of flue gases with the aid of an annular-gap washer is known, for example, from commonly owned U.S. Pat. Nos. 3,726,065 and 3,791,108. These washers comprise a tubular body which is interposed between coaxial upper and lower parts of a descending gas-discharge duct to form a constriction or waist, that body coacting with an insert which can be raised or lowered to vary the effective width of an annular gap formed between them. The vertical adjustment of the insert controls the pressure differential existing across the gap as well as the flow velocity at its exit end.

In eariler systems of this type, as illustrated in the above-identified patents, the insert is generally pear-shaped and defines the controlled gas passage with an upper portion of the surrounding nozzle body above its waist. In commonly owned application Ser. No. 670,542, filed by me jointly with others on Mar. 25, 1976, there has been disclosed a frustoconical insert whose downwardly diverging peripheral surface defines an annular gap with the lower portion of the nozzle body. The top of the frustocone projects into the duct above the waist and defines a downwardly converging throat with the upper portion of the nozzle body.

In contrast to the earlier pear-shaped inserts, whose downwardly converging flow-controlling surfaces were sheltered from direct, impingement by the oncoming gas, the downwardly diverging inserts are directly exposed to the gas in the upper part of their peripheral surface which is therefore subject to rapid wear and corrosion.

OBJECTS OF THE INVENTION

Thus, an object of my present invention is to provide an improved nozzle of the type last referred to which can withstand the attack of these hot gases.

Another object is to provide means in such a nozzle for facilitating the replacement of the most wear-prone parts of its insert without requiring the entire insert to be discarded.

SUMMARY OF THE INVENTION

I realize these objects, in accordance with my present invention, by providing the insert at least near its top with a refractory layer covering an annular zone of its peripheral surface, this layer being advantageously disposed on a detachable top section of the insert.

In principle, the refractory layer could be a surface coating applied, for example, by flame spraying. I prefer, however, to form the top section of the insert with a peripheral recess in which the refractory layer is embedded, this technique allowing the use of heavier layers compared with a surface coating.

BRIEF DESCRIPTION OF THE DRAWING

The above and other features of my invention will now be described in detail with reference to the accompanying drawing in which.

SPECIFIC DESCRIPTION

Figure 1:
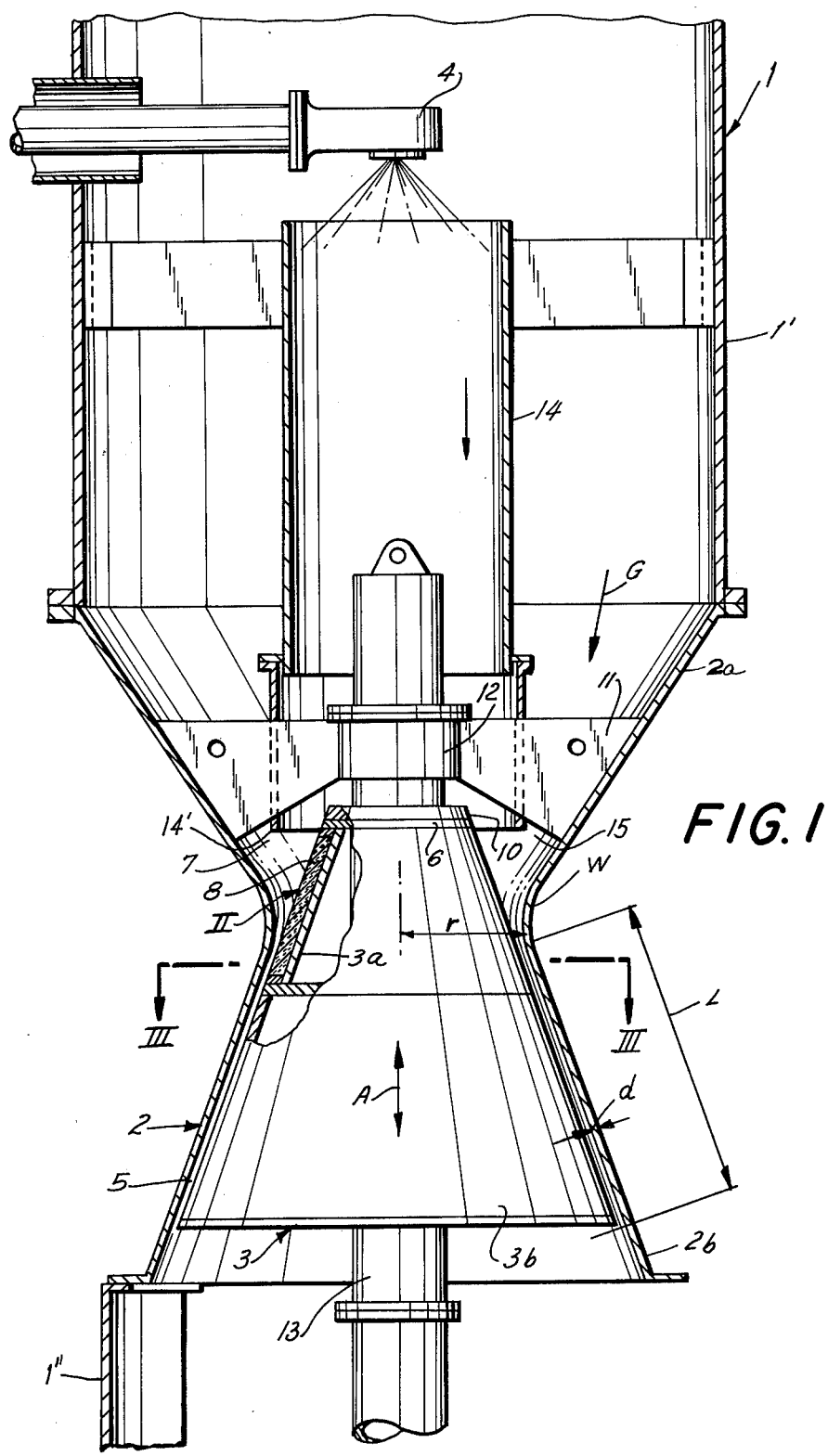
FIG. 1 is an axial sectional view of a scrubbing station comprising a nozzle according to my invention.
Figure 2:
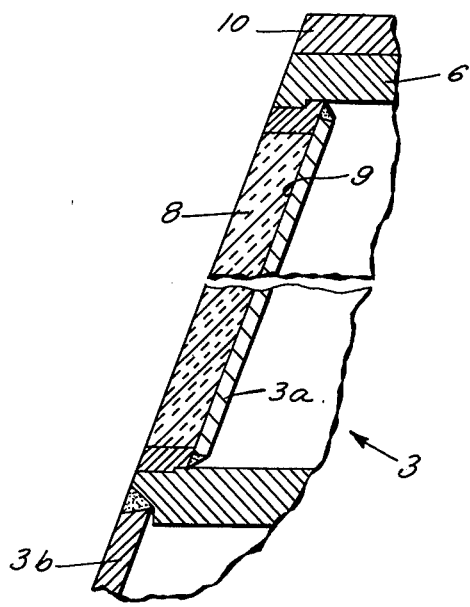
FIG. 2 is an enlarged detail view of an area designated II in FIG. 1.
Figure 3:
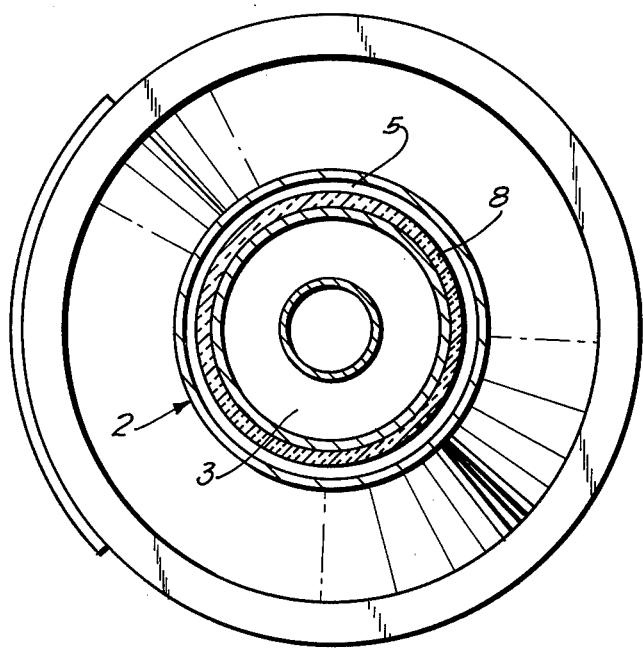
FIG. 3 is a cross-sectional view taken on the line III—III of FIG. 1.

The scrubbing station shown in FIG. 1 comprises a duct 1 coming, for example, from the flue of a nonillustrated blast furnace. The duct is interrupted by a vertical gap separating an upper part 1' thereof from a lower part 1''; a nozzle interposed in this gap includes a tubular body 2 of hourglass configuration and a vertically movable insert 3 with a frustoconical peripheral surface defining an annular channel 5 of adjustable width $d$ with the lower portion of body 2. A spray head 4 above the nozzle assembly irrigates the descending gas flow G, the spray water being guided by a central tube 14 onto the top of the frustoconical insert 3. Tube 14 is fixedly secured to the upper duct part 1', as shown, below spray head 4. The insert 3 comprises a central stem 13 rising along the duct axis from a non-illustrated control station which allows the insert to be raised or lowered, e.g. in response to variations in the pressure differential across the channel 5 as described in the aforementioned Pat. No. 3,726,065. Stem 13 is vertically guided in a bearing 12 which is supported by radial wings 11 on an upwardly diverging upper portion 2a of the body 2 separated from its downwardly diverging lower portion 2b by a waist W.

Insert 3 is vertically subdivided into a top section 3a and a bottom section 3b with mutually complementary frustoconical surfaces whose generatrices substantially parallel those of the lower portion 2b of the nozzle body. Bottom section 3b is fixedly mounted on stem 13 whereas top section 3a is removably secured thereto by a cover 6 held in position by a disk 10 which can be detached from the stem 13 when the latter is downwardly extracted from its bearing 12. Disk 10 may be secured to the stem by threads, cotter pins or other convenient means.

In any operating position of insert 3, its top section 3a extends past the waist W and forms with nozzle portion 2a a downwardly converging throat 7 which forces the oncoming gas G into the controlled passage 5 together with the wash water from spray head 4. The outer surface of this section 3a is recessed at 9 to accommodate a layer 8 of refractory material such as, for example, alumina or magnesia. Whenever this layer 8 shows signs of excessive wear, this section may be removed in the aforedescribed manner and replaced by one with a fresh refractory layer. The axial height of section 3a should at least equal the radius $r$ of nozzle body 2 at its waist W. Body portion 2a forms with a bottom edge 14' of guide tube 14, lying above waist W, a ring space 15 which directs the gas flow G onto refractory layer 8, as shown.

The length L of the annular gap or ring channel 5 preferably is at least equal to twice the diameter of the insert at its minor base. The confronting surfaces of nozzle body 2 and insert 3, or at least one of them, may be corrugated or otherwise roughened.

The channel width $d$ need not necessarily be constant, as shown, but could change over its length, e.g. diminishing toward the exit end, in order to modify the variation in pressure differential obtained with a given vertical displacement stroke of the insert.

Since the descending gas flow experiences considerable cooling by the spray water within gap 5, the lower insert section 3b generally need not be coated or clad with refractory material.

I claim:

1. In a duct traversed by a descending flow of hot flue gases and divided into coaxial upper and lower parts, the upper part of said duct being provided with spray means for irrigating the gas flow with a liquid and being further provided with a stationary central tube extending downwardly from said spray means for the guidance of said liquid, the combination therewith of a flow-controlling nozzle comprising a generally hourglass-shaped tubular body interposed between said parts, said body having a waist substantially narrower than said duct separating a downwardly converging upper portion from a downwardly diverging lower portion of said body, and an insert in said body having a downwardly diverging peripheral surface of generally frustoconical shape which defines with said lower portion a narrow annular channel, said insert being vertically displaceable in said body between several operating positions for varying the width of said channel and being provided with a refractory layer on at least an annular zone of said surface extending above said waist in any of said operating positions, said tube having a bottom edge which lies above said waist and defines with said body a ring space directing the gas flow from around said tube toward said refractory layer.

2. The combination defined in claim 1 wherein the height of said zone is at least equal to the radius of said waist.

3. The combination defined in claim 1 wherein said insert has a separable top section carrying said layer.

4. The combination defined in claim 3 wherein said zone is a peripheral recess in said top section occupied by said layer.

5. The combination defined in claim 1 wherein said insert comprises a bottom section and a complementary top section together forming said peripheral surface, said top section carrying said refractory layer and being separable from said bottom section.

6. In a duct traversed by a descending flow of hot flue gases and divided into coaxial upper and lower parts, the combination therewith of a flow-controlling nozzle comprising a generally hourglass-shaped tubular body interposed between said parts, said body having a waist substantially narrower than said duct separating a downwardly converging upper portion from a downwardly diverging lower portion of said body, and an insert in said body having a central stem and a downwardly diverging peripheral wall of generally frustoconical shape coaxially surrounding said stem, said peripheral wall being divided into a bottom section rigid with said stem defining a narrow annular channel with said lower portion and a complementary top section defining a downwardly converging throat with said upper portion just above said waist, said top section being detachably secured to said stem for separation from said bottom section, said stem being vertically displaceable in said body between several operating positions for varying the width of said channel, said top section projecting above said waist in any of said operating positions.

7. The combination defined in claim 6 wherein said top section is provided with a refractory layer extending over at least the major part of its surface.

8. The combination defined in claim 7 wherein said top section has a peripheral recess occupied by said layer.

9. The combination defined in claim 6 wherein said top and bottom sections have generatrices substantially paralleling those of said lower portion.

10. The combination defined in claim 9 wherein said top section has a height at least equal to the radius of said waist.

* * * * *